United States Patent
Litton et al.

(10) Patent No.: US 12,012,208 B2
(45) Date of Patent: Jun. 18, 2024

(54) SYSTEMS AND METHODS FOR INSPECTING STRUCTURES WITH AN UNMANNED AERIAL VEHICLE

(71) Applicant: OSMOSE UTILITIES SERVICES, INC., Peachtree City, GA (US)

(72) Inventors: Richard Wayne Litton, Peachtree City, GA (US); Matt Gardner, Peachtree City, GA (US); Kevin Niles, Peachtree City, GA (US)

(73) Assignee: OSMOSE UTILITIES SERVICES, INC., Peachtree City, GA (US)

( * ) Notice: Subject to any disclaimer, the term of this patent is extended or adjusted under 35 U.S.C. 154(b) by 164 days.

(21) Appl. No.: 17/559,517

(22) Filed: Dec. 22, 2021

(65) Prior Publication Data

US 2022/0194578 A1    Jun. 23, 2022

Related U.S. Application Data

(60) Provisional application No. 63/130,352, filed on Dec. 23, 2020.

(51) Int. Cl.
| | | |
|---|---|---|
| *B64C 39/02* | (2023.01) | |
| *G01N 21/954* | (2006.01) | |
| *G05D 1/00* | (2006.01) | |
| *B64U 10/13* | (2023.01) | |
| *B64U 101/00* | (2023.01) | |

(52) U.S. Cl.
CPC ......... *B64C 39/024* (2013.01); *G01N 21/954* (2013.01); *G05D 1/0094* (2013.01); *G05D 1/101* (2013.01); *B64U 10/13* (2023.01); *B64U 2101/00* (2023.01); *G01N 2021/9542* (2013.01)

(58) Field of Classification Search
CPC ...... B64C 39/024; B64U 10/13; B64U 10/14; B64U 2101/00; B64U 2101/25; B64U 2101/26; G01N 21/954; G01N 2021/9542; G05D 1/0094; G05D 1/101
See application file for complete search history.

(56) References Cited

U.S. PATENT DOCUMENTS

| | | | |
|---|---|---|---|
| 9,611,038 B2 | 4/2017 | Dahlstrom | |
| 9,753,461 B1 * | 9/2017 | Johnson | ................ B64D 47/08 |
| 9,764,838 B2 | 9/2017 | Priest | |

(Continued)

FOREIGN PATENT DOCUMENTS

| | | |
|---|---|---|
| CN | 110435891 A | 11/2019 |
| CN | 111879267 A | 11/2020 |

(Continued)

OTHER PUBLICATIONS www.apellix.com, Website of Apellix Corporation, (27 pages, accessed and printed Apr. 21, 2022).

*Primary Examiner* — Benjamin P Lee
(74) *Attorney, Agent, or Firm* — Troutman Pepper Hamilton Sanders LLP; James E. Schutz; Korbin M. Blunck

(57) ABSTRACT

Systems and methods for inspecting or maintaining a structure, such as a utility pole or a metal tower), with an unmanned aerial vehicle (UAV) are disclosed. The UAV can be configured to fly to a target location on the structure and measure characteristics of the structure such as a component thickness. The UAV can precisely repeat the measurement at a later time to determine any change in component thickness.

20 Claims, 10 Drawing Sheets

(56) References Cited

U.S. PATENT DOCUMENTS

| | | | |
|---|---|---|---|
| 10,011,352 B1* | 7/2018 | Dahlstrom | B64U 30/20 |
| 10,187,806 B2 | 1/2019 | Priest | |
| 10,192,354 B2 | 1/2019 | Terry et al. | |
| 10,195,629 B1* | 2/2019 | Dahlstrom | G05D 1/0088 |
| 10,327,151 B2 | 6/2019 | Priest | |
| 10,382,975 B2 | 8/2019 | Priest | |
| 10,399,676 B2 | 9/2019 | Dahlstrom | |
| 10,417,755 B1* | 9/2019 | Wingo | H04W 24/04 |
| 10,509,417 B2 | 12/2019 | van Cruyningen | |
| 10,564,649 B2 | 2/2020 | van Cruyningen | |
| 10,821,463 B2* | 11/2020 | Busby | B05B 9/0403 |
| 10,974,830 B2* | 4/2021 | Bosworth | B25J 15/0213 |
| 11,001,380 B2* | 5/2021 | Nahuel-Andrejuk | G01D 21/00 |
| 11,167,847 B2 | 11/2021 | Dahlstrom | |
| 11,235,890 B1* | 2/2022 | Dahlstrom | B05C 11/1005 |
| 11,498,090 B2* | 11/2022 | Thompson | B05B 9/047 |
| 2009/0050750 A1* | 2/2009 | Goossen | B64C 39/024 901/14 |
| 2016/0082460 A1* | 3/2016 | McMaster | B05B 9/0403 239/722 |
| 2016/0236346 A1* | 8/2016 | Lee | B25J 9/10 |
| 2018/0117731 A1* | 5/2018 | Fielding | B24B 41/005 |
| 2018/0257774 A1* | 9/2018 | Volpi | B25J 11/00 |
| 2018/0273173 A1 | 9/2018 | Moura | |
| 2019/0166765 A1* | 6/2019 | Maor | G08G 5/0073 |
| 2019/0202554 A1* | 7/2019 | Bosworth | B60L 53/60 |
| 2019/0260191 A1 | 8/2019 | Lavoie et al. | |
| 2019/0265705 A1* | 8/2019 | Zhang | G01C 21/20 |
| 2019/0276140 A1* | 9/2019 | Poltorak | B64C 39/024 |
| 2019/0314990 A1* | 10/2019 | Sugaki | B25J 9/162 |
| 2019/0368133 A1* | 12/2019 | Joshi | G06T 7/11 |
| 2019/0369057 A1* | 12/2019 | Mattar | G01N 29/14 |
| 2020/0166938 A1* | 5/2020 | Hafenrichter | G05D 1/101 |
| 2020/0367441 A1* | 11/2020 | Guzmán López | A01G 3/088 |
| 2021/0155344 A1* | 5/2021 | Mura Yañez | B64U 70/00 |
| 2021/0237867 A1* | 8/2021 | Georgeson | B64D 47/08 |
| 2021/0299845 A1* | 9/2021 | Frenken | H02G 1/02 |
| 2022/0073205 A1* | 3/2022 | Hertzberg | B64D 1/18 |
| 2022/0083774 A1* | 3/2022 | Das | G06V 10/40 |
| 2022/0399936 A1* | 12/2022 | Arksey | H04W 28/24 |
| 2023/0016831 A1* | 1/2023 | Merrick | B64C 39/02 |

FOREIGN PATENT DOCUMENTS

| | | | | |
|---|---|---|---|---|
| CN | 112594322 A | 4/2021 | | |
| CN | 112665648 A | 4/2021 | | |
| CN | 112729132 A | 4/2021 | | |
| CN | 112730272 A | 4/2021 | | |
| DE | 102018114014 A1 * | 12/2019 | | B25F 5/02 |
| WO | WO-2018094514 A1 * | 5/2018 | | B64C 39/02 |

* cited by examiner

SYSTEMS AND METHODS FOR INSPECTING STRUCTURES WITH AN UNMANNED AERIAL VEHICLE

CROSS-REFERENCE TO RELATED APPLICATION

This application claims the benefit of U.S. Provisional Application No. 63/130,352, filed 23 Dec. 2020, the entire contents and substance of which are hereby incorporated by reference.

BACKGROUND

Utility lines, such as those carrying electrical power, cable television signals, or telephone signals, have traditionally been supported above ground using poles (e.g., wooden poles) or metal structures (e.g., metal lattice towers). Regardless of the type used, such structures can become subject to damage and/or degradation over time, which can be caused by environmental exposure, for example. To increase the life of these structures, certain maintenance programs can be employed, and such maintenance programs generally include a periodic inspection of some or all structures (e.g., poles, towers) in a population of structures. Such inspections can be extraordinarily cumbersome and impracticable difficult due to, as non-limiting examples, the sheer number of structures and the difficulty in physically accessing certain structures, which can be located at the far reaches of a utility network, such as isolated regions that are not readily accessible by road. Also, this process can be time-consuming and expensive due to, for example, the large number of man hours required to inventory structures for a given utility network. Further, because existing processes typically require an on-site technician to estimate a current status of a given structure (e.g., whether a portion of the structure is damaged, whether the structure requires repair or replacement) from a position on the ground, the technician may be unable to accurately view or diagnose issues with the structure, particularly at locations at or near to the top of the structure. Relatedly, because existing processes are reliant on human observation and data logging by a large number of technicians, it is possible that certain data can be inaccurate or inconsistently obtained and/or logged.

Alternatively, technicians can climb a given structure to obtain inspection information of increased accuracy, but this can be a time-consuming, expensive (e.g., based on the time required for a technician to climb and inspect a given structure), and/or dangerous practice.

Likewise, certain actions required by the maintenance program can require the technician to climb the structure to perform the maintenance action, which can likewise be time-consuming, expensive (e.g., based on the time required for a technician to climb and inspect a given structure), and/or dangerous. Furthermore, some structures support high voltage transmission lines, and inspecting and/or performing maintenance at a location near the high voltage transmission line can be dangerous or impossible without disabling a portion of the utility grid.

Accordingly, there is a need for improved systems and methods that increase the accuracy, consistency, speed, efficiency, and/or cost-effectiveness by which a structure (and/or components thereof) can be inspected, maintained, and/or replaced.

SUMMARY

These and other problems are addressed by certain aspects and attributes of the disclosed technology. For example, the disclosed technology relates to the use of one or more unmanned aerial vehicles to inspect and/or maintain various aspects or components of a structure, such as a utility pole, a metal tower (e.g., a guy metal lattice tower), or the like.

The disclosed technology included an unmanned aerial vehicle (UAV) for inspecting or maintaining a structure. The UAV can include a body, one or more rotor assemblies, a component assembly, a geolocation sensor, an altitude sensor, and a controller. The one or more rotor assemblies can be configured to provide lift and directional movement to the UAV. The geolocation sensor can be configured to determine a current geolocation of the UAV and output geolocation data (e.g., to the controller) corresponding to the current geolocation of the UAV. The altitude sensor can be configured to detect a current altitude of the UAV and output altitude data (e.g., to the controller) corresponding to the current altitude of the UAV. The controller can be configured to receive component data from the component assembly, receive the geolocation data and the altitude data, and output flight instructions comprising geolocation data and altitude data corresponding to the component data. The flight instructions can be associated with a flight path to one or more specific locations on the structure.

The controller can be further configured to store the flight instructions on local memory of the UAV. The controller can be further configured to transmit the flight instructions to a remote computing device.

The controller can be further configured to output the flight instructions to the one or more or rotor assemblies to instruct the one or more rotor assemblies to navigate the UAV to the one or more specific locations on the structure.

The UAV can include a connection port. The component assembly can be one of a plurality of component assemblies. Each of the plurality of component assemblies can be a different type of component assembly, and each of the plurality of component assemblies can be configured to detachably attach to the connection port. Each of the plurality of component assemblies can have a first side configured to detachably attach to the connection port and a second side configured to detachably attach to another of the plurality of component assemblies.

The component assembly can comprise a sensor assembly. The sensor assembly can include a camera, a LiDAR sensor assembly, a radar sensor assembly, an ultrasonic probe assembly, a current sensor assembly, a borescope, a caliper assembly, or a non-conductive gap tool.

The component assembly can include a tool assembly. The tool assembly can include an articulable arm, an electromagnet, or a drill assembly.

The controller can be further configured to associate the flight instructions with a structure type associated with the structure.

The structure can be a first structure. The controller can be further configured to, in response to receiving data indicating that a second structure is of the structure type associated with the first structure, output the flight instructions to the one or more or rotor assemblies to instruct the one or more rotor assemblies to navigate the UAV to one or more specific locations on the second structure that substantially correspond to the one or more specific locations on the first structure.

The component assembly can be a drill assembly. The component data can correspond to an inspection hole drilled into the structure by the drill assembly. The drill assembly can be detachably attachable to the UAV, and the UAV can include a borescope that is detachably attachable to the UAV. The controller can be configured to output the flight instructions to the one or more or rotor assemblies to instruct the one or more rotor assemblies to navigate the UAV to the inspection hole and at least partially insert the borescope into the inspection hole.

The component assembly can be a non-conductive gap tool having a notched portion, and a notch of the notched portion can be configured to at least partially receive and smoothly slide along a conductor having an expected dimension. The component data can correspond to a smoothness of a conductor associated with the structure, and a bump in the smoothness of the conductor can be indicative of a detected dimension that is greater than the expected dimension, which can indicate corrosion on the conductor.

The non-conductive gap tool can include a displacement sensor configured to detect whether the notched portion encounters the detected dimension of the conductor that is greater than the expected dimension. Alternatively or in addition, the controller can be configured to determine that an actual flight path of the UAV is different from an expected flight path of the UAV, and the expected flight path can be based at least in part on a path of the conductor. The controller can be configured to determine that the detected dimension of the conductor is greater than the expected dimension based at least in part on the actual flight path of the UAV being different from the expected flight path of the UAV.

The UAV can include a gyroscope configured to output gyroscope data, and the flight instructions can further include gyroscope data corresponding to the component data.

The component assembly can be attached to an underside of the body. The UAV can include a lower frame, and the lower frame can be configured to support the UAV when the UAV is in a grounded position. The lower frame can have a height sufficient to provide clearance between a bottom edge of the component assembly and a surface on which the lower frame rests when the UAV is in the grounded position.

The UAV can include a body, one or more rotor assemblies, a component assembly, a camera, an articulable arm, a geolocation sensor, an altitude sensor, and a controller. The one or more rotor assemblies can be configured to provide lift and directional movement to the UAV. The geolocation sensor can be configured to determine a current geolocation of the UAV and output geolocation data (e.g., to the controller) corresponding to the current geolocation of the UAV. The altitude sensor can be configured to detect a current altitude of the UAV and output altitude data (e.g., to the controller) corresponding to the current altitude of the UAV. The controller can be configured to output instructions for the one or more rotor assemblies to navigate the UAV to a top end of a structure. The controller can be configured to receive camera data from the camera and determine, based at least in part on the camera data, whether an existing pole cap is located on the top end of the structure. The controller can be configured to, in response to determining that an existing pole cap is not located on the top end of the structure, output instructions for the articulable arm to install a new pole cap on the top end of the structure.

The controller can be further configured to, prior to outputting the instructions for the articulable arm to install the new pole cap on the top end of the structure, output instructions for the one or more rotor assemblies to navigate the UAV to the new pole cap, output instructions for the articulable arm to retrieve the new pole cap, and output instructions for the one or more rotor assemblies to navigate the UAV to the top end of the structure.

Other examples, embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1A:
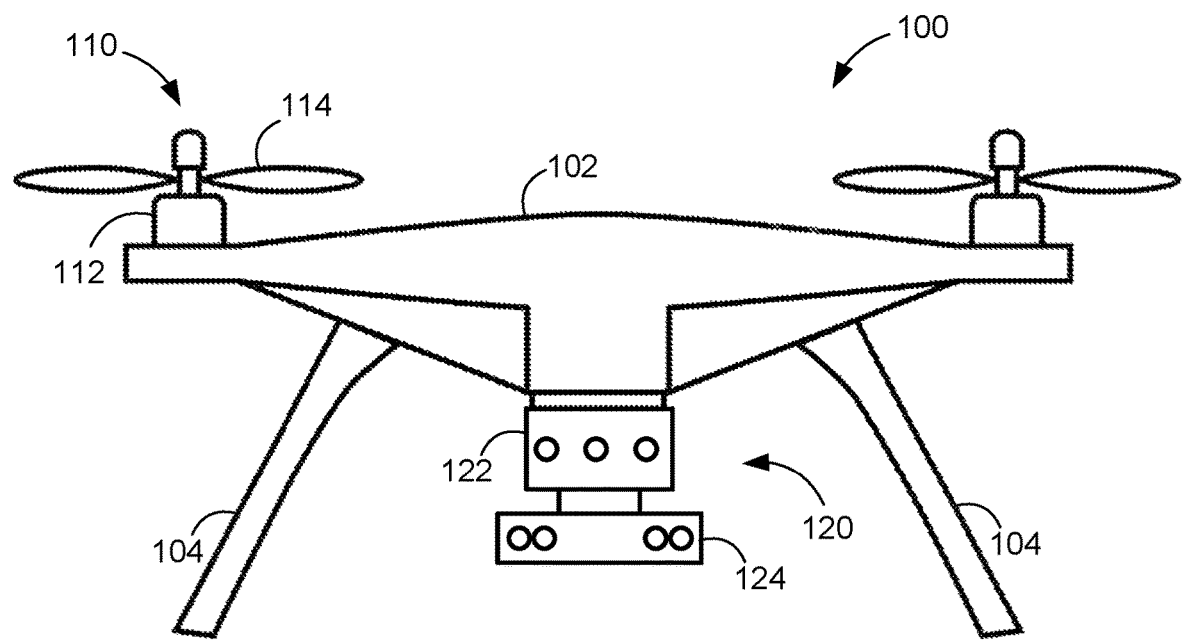
FIGS. 1A-1G illustrate various configurations of an example unmanned aerial vehicle (UAV), in accordance with the disclosed technology.

The disclosed technology includes systems and methods for inspecting a structure with an unmanned aerial vehicle (UAV) and/or performing one or more actions, such as maintenance actions, with a UAV.

Aspects of the disclosed technology will be described more fully hereinafter with reference to the accompanying drawings. This disclosed technology can, however, be embodied in many different forms and should not be construed as limited to the examples set forth therein.

In the following description, numerous specific details are set forth. However, it is to be understood that various examples of the disclosed technology can be practiced without these specific details. In other instances, well-known methods, structures, and techniques have not been shown in detail in order to not obscure an understanding of this description. References to "one embodiment," "an embodiment," "example embodiment," "some embodiments," "certain embodiments," "various embodiments," "one example," "an example," "some examples," "certain examples," "various examples," etc., indicate that the example(s) of the disclosed technology so described can include a particular feature, structure, or characteristic, but not every implementation of the disclosed technology necessarily includes the particular feature, structure, or characteristic.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to and are not intended to imply that the objects so described must be in a given sequence, either temporally, spatially, in ranking, or in any other manner.

As used herein, the term "pole" includes various forms and definitions of elongated support members (e.g., posts, pilings), whether or not constructed of wood. As used herein, the term "tower" includes various forms and definitions of structures (e.g., lattice tower, guyed mast), whether or not constructed of metal.

Unless otherwise specified, any range of values provided herein is inclusive of its endpoints. For example, the phrases "between 4 and 6" and "from 4 to 6" both indicate a range of values that includes 4, 6, and all values therebetween.

Referring now to FIGS. 1A-1G, the disclosed technology includes an unmanned aerial vehicle (UAV) 100 configured to perform inspections of a structure, such as a utility pole, a utility tower, or the like. The UAV 100 can include a body 102, a lower frame 104, and one or more rotor assemblies 110. The lower frame 104 can include a support structure (e.g., a plurality of legs) configured to support the UAV 100 when it is in a grounded position. The lower frame 104 can have a height that provides clearance between the bottom of the body 102 and the surface on which the lower frame is resting 104 that is sufficient to accommodate one or more components, such as those described more fully herein (e.g., one or more sensors, one or more articulable arms). That is to say, lower frame 104 has a height such that the one or more components are separated from the ground when the UAV 100 is in the grounded position. Each rotor assembly 110 can include a corresponding motor 112 (e.g., an electric motor) and one or more rotor blades 114. Together, the rotor assemblies 110 can form a propulsion system configured to provide lift and directional flight to the UAV 100. As described more fully herein, the UAV 100 can include a local controller, which can be located inside the body 102 or any location on or in the UAV 100. The UAV 100 can include one or more batteries configured to supply power to the controller, the rotor assemblies 110, and any additional components in communication with the UAV 100.

The UAV 100 can include one or more sensor assemblies 120, as described more fully herein. One or more of the sensor assemblies 120 can be located on an underside of the body 102. Alternatively or in addition, one or more of the sensor assemblies 120 can be located on a top surface or a side surface of the body 120. As non-limiting examples, the one or more sensor assemblies 120 can include a caliper sensor assembly, an ultrasonic sensor assembly (e.g., an ultrasonic transducer, an ultrasonic receiver, and/or an ultrasonic transceiver configured to act as an ultrasonic gauge), a camera (e.g., a borescope camera), a LiDAR sensor assembly (e.g., a laser and corresponding receiver sensor) a radar sensor assembly, a current meter, a non-conductive gap tool, or the like. As discussed more fully herein, the sensor(s) 120 can be configured make certain measurements and/or detections and output corresponding sensor data to a controller.

As illustrated in FIG. 1A, the sensor assemblies 120 can include a camera 122 and/or a LiDAR sensor assembly 124 (and/or a radar sensor assembly). The camera 122 can be configured to obtain image data corresponding to images of a target area and/or object and output the image data for a controller. The image data can relate to still images, or the image data can relate to video images. The camera 122 can be configured to obtain images in the visible spectrum, the infrared spectrum, the ultraviolet spectrum, or any other light spectrum. The LiDAR sensor assembly 124 can include one or more lasers and one or more receivers. The LiDAR sensor assembly 124 can be configured to obtain LiDAR data corresponding to one or more objects or portions thereof and output the LiDAR data for a controller. Optionally, the UAV 100 and/or the various sensor assemblies 120 can include a stabilizing system, device, or mechanism, such as a gimbal, which can help decrease skewed data (e.g., any blurred imaging or otherwise corrupted data) captured by a corresponding sensor assembly 120.

Figure 1B:
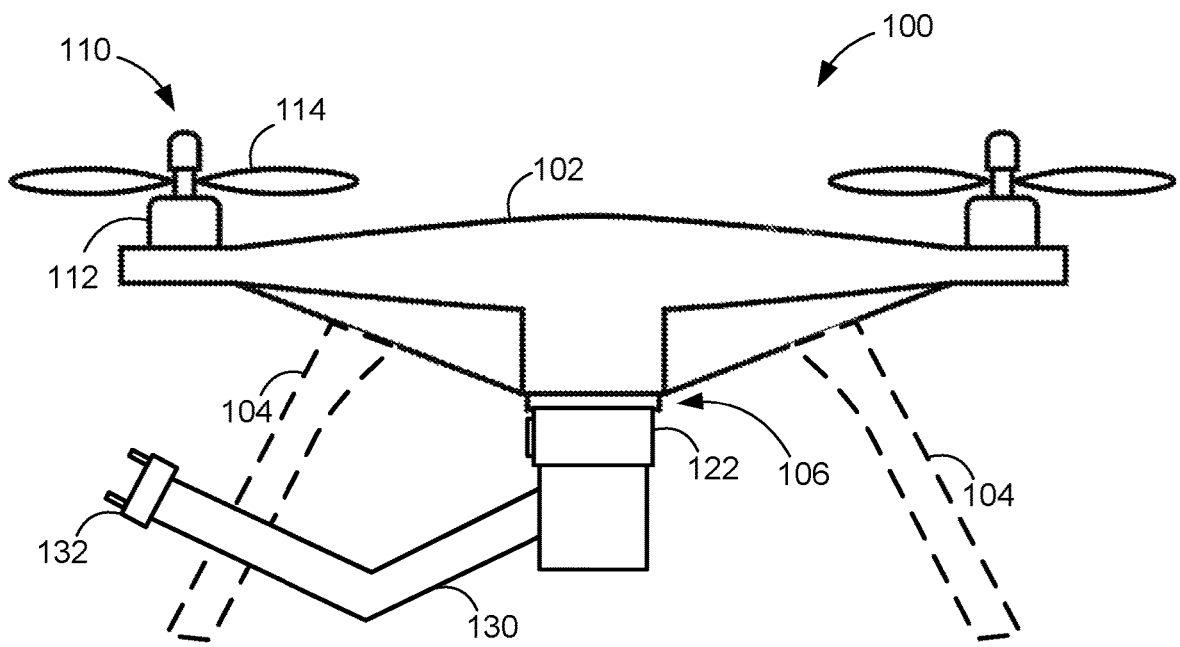

The UAV 100 can, alternatively or in addition, include one or more articulable arms 130, such as the example UAV 100 illustrated in FIG. 1B. Each arm 130 can include one or more joints, and one or more motors configured to move the arm 130 in a plurality of positions. As discussed more fully herein, the arm(s) 130 (and/or components thereof) can receive instructions from a controller, and the arm(s) 130 can be configured to perform one or more actions based on the instructions received from the controller. The arm 130 can include pinchers 132, which can be configured to move toward and away from one another (e.g., to grab an object). Alternatively or in addition, the arm 130 can include a caliper assembly. The caliper assembly can be the same or similar to the pinchers 132. The caliper assembly can be configured to obtain caliper data relating to a measured thickness of an object and output the caliper data for a controller.

The UAV 100 can include a component port 106 configured to receive one or more components (e.g., one or more sensor assemblies 120 and/or one or more articulable arms 130 and/or one or more tools, such as a drill). The various components can each be configured to detachably attach to the UAV 100 (e.g., via the component port 106) such that the various components are interchangeable. The various components can each be configured to detachably attach to the UAV 100, and each component can be configured to detachably attach to one or more other components. For example, each component can have a first attachment port on a first side of the component and a second attachment port on a second side of the component. The first attachment port can be configured to detachably attach (mechanically and electronically) to the UAV 100, and the first attachment port and/or second attachment port can be configured to detachably attach (mechanically and electronically) to one or more other components. In this way, multiple components can be attached to the UAV 100 at a given time. Alternatively or in addition, the UAV 100 can include multiple component ports 106 such that multiple components can be attached directly to the UAV 100 at a given time. As will be appreciated, the interchangeability of the various sensor assemblies 120 and/or tools can help alleviate any payload concerns stemming from FIGS. 1B-1G illustrate examples of various components, such as one or more sensor assemblies 120 (e.g., a camera 122, a LiDAR sensor assembly 124, a radar sensor assembly, an ultrasonic probe assembly 126, a current sensor assembly 127, a borescope 128, a caliper assembly, a non-conductive gap tool 129) and/or one or more tools (e.g., an articulable arm 130, an electromagnet 140, a drill assembly 150). For clarity of illustration, FIGS. 1B-1G depict the lower frame 104 in dashed lines.

Referring to FIG. 1B, one or more of the arm assemblies 130 can be configured to detachably attach to the UAV 100. Alternatively or in addition, a camera 122 can be configured to detachably attach to the UAV 100 (e.g., via the component port 106). As illustrated in FIG. 1B, a first component (e.g., the camera 122) can be configured to detachably attach to the UAV 100, and a second component (e.g., the arm 130) can be configured to detachably attach to the first component. In such a way, the second component can be placed in electronic communication with the UAV 100 (and the corresponding controller) via the first component.

Figure 1C:
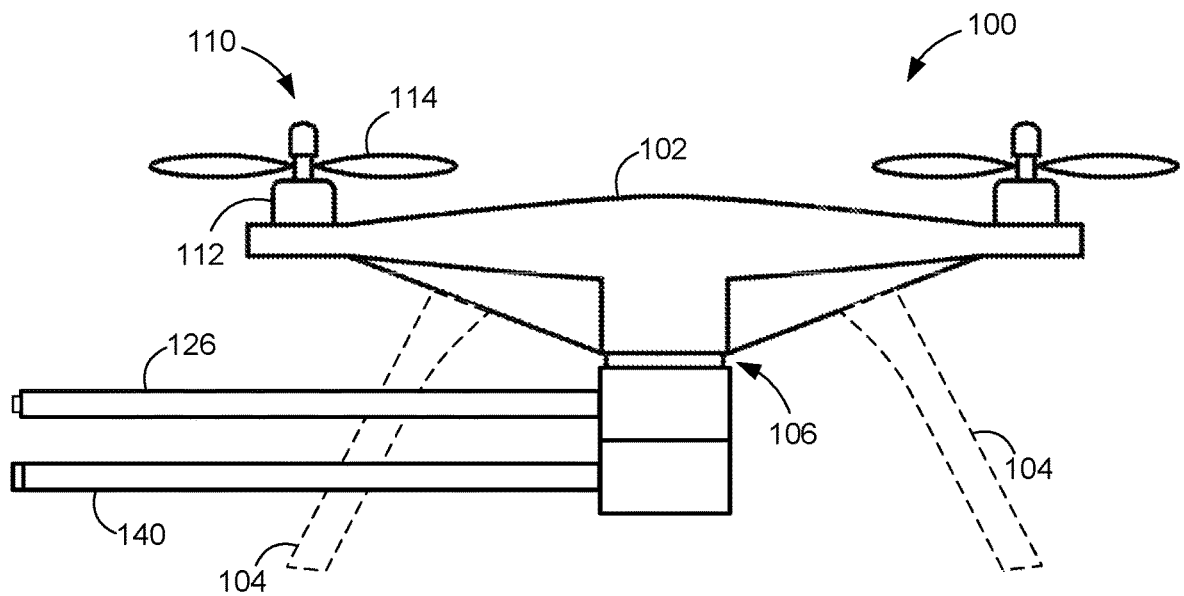

Referring now to FIG. 1C, an ultrasonic probe assembly 126 can be configured to detachably attach to the UAV 100 (e.g., via the component port 106). The ultrasonic probe assembly 126 can be configured to output and measure or capture ultrasonic sound waves to determine thickness (e.g., depth) measurements. In this way, the ultrasonic probe assembly 126 can be configured to measure and/or detect thickness changes in an object and output ultrasonic data to the controller, as discussed more fully herein. Optionally, the ultrasonic probe assembly (e.g., the transducer) can be coated or covered with an ultrasonic couplant, which is a liquid, gel, or paste configured to help facilitate the transmission of sound energy between an ultrasonic transducer and the test piece. Alternatively or in addition, the end of the ultrasonic probe assembly 126 can include an absorbent material (e.g., a sponge), which can be saturated with and hold the ultrasonic couplant.

An electromagnet 140 can be configured to detachably attach to the UAV 100 (e.g., directly to the UAV 100, via a sensor assembly 120 or another tool). The electromagnet 140 can be configured to receive instructions from the controller and output an electromagnetic force based on the instructions received from the controller. In this way, the electromagnet 140 can attach the UAV 100 to a ferrous material (e.g., a portion of a structure) and/or can stabilize the UAV 100 while a sensor assembly is taking measurements. While the electromagnet 140 is illustrated as a distinct component, the disclosed technology is not so limited. For example, the electromagnet 140 can alternatively be attached to or otherwise incorporated in a given sensor assembly 120. As a more specific example, the ultrasonic probe assembly 126 can include one or more electromagnets 140 located at or near the end of the probe to directly hold the ultrasonic probe assembly 126 or contact with, or in close proximity to, a ferrous material. The electromagnet(s) 140 can be located adjacent to the ultrasonic transducer, ultrasonic receiver, and/or ultrasonic transceiver (e.g., on one side, on either side, or substantially surrounding the ultrasonic transducer, ultrasonic receiver, and/or ultrasonic transceiver).

As another example, the UAV 120 can include a plurality of electromagnets arranged in a conveyer-like configuration, and the conveyer can rotate such that the plurality of electromagnets can continuously rotate. The conveyer of electromagnets can be configured to contact a surface, and the plurality of electromagnets can be sequentially engaged (i.e., producing a magnetic force) and sequentially disengaged (i.e., not producing a magnetic force). That is to say, a given electromagnet 140 on the conveyor can become engaged as it rotates and comes into contact with the surface, and as the conveyer continues to rotate a subsequent electromagnet on the conveyor can become engaged as it comes into contact with the surface. Likewise, as the conveyor rotates, a given electromagnet 140 can become disengaged as it ceases to contact the surface and a subsequent electromagnet on the conveyor can become disengaged as it ceases to contact the surface. This process can continue to cause the conveyor of electromagnets 140 to traverse along the surface, which can help provide measurements of higher precision (e.g., with the ultrasonic probe assembly 126).

Figure 1D:
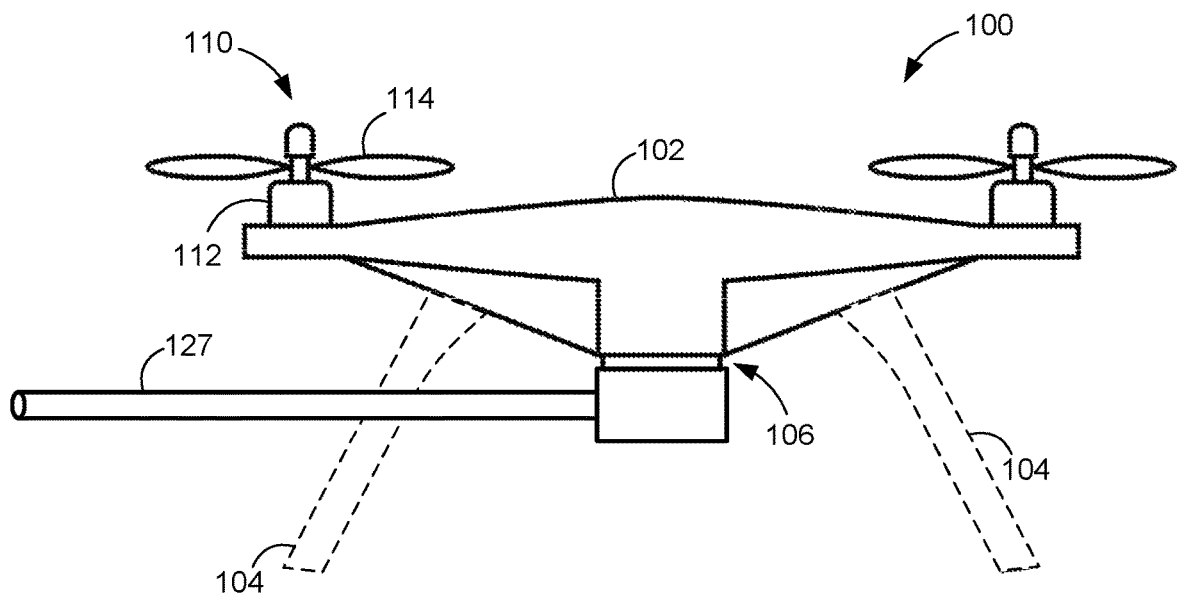

Referring to FIG. 1D, a current sensor assembly 127 can be configured to detachably attach to the UAV 100 (directly to the UAV 100, via a sensor assembly 120 or another tool). The current sensor assembly 127 can be configured obtain current data corresponding to a flow of current through a conductor (e.g., a cable, an electrical power transmission conductor) or a related component and output the current data for the controller.

Figure 1E:
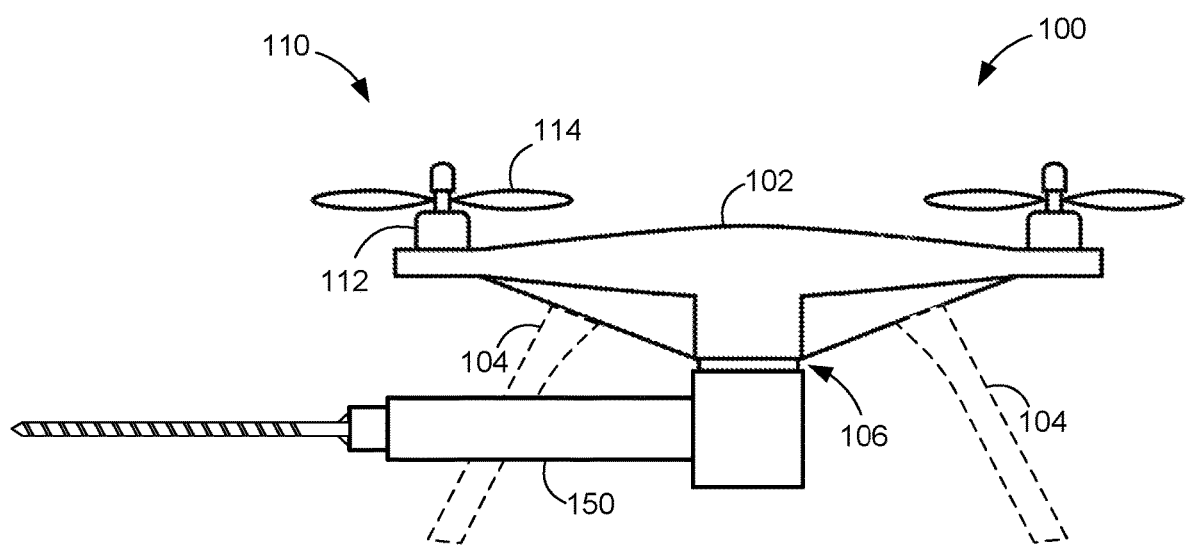

As illustrated in FIG. 1E, a drill assembly 150 can be configured to detachably attach to the UAV 100 (directly to the UAV 100, via a sensor assembly 120 or another tool). The drill assembly 150 can be configured to receive instructions from the controller and rotate a drill bit based on the instructions received from the controller. The drill assembly 150 can be configured to drill or bore a hole into an object, such as a portion of a structure. As a more specific example, the drill assembly 150 can be configured to drill an inspection hole into a utility pole.

Figure 1F:
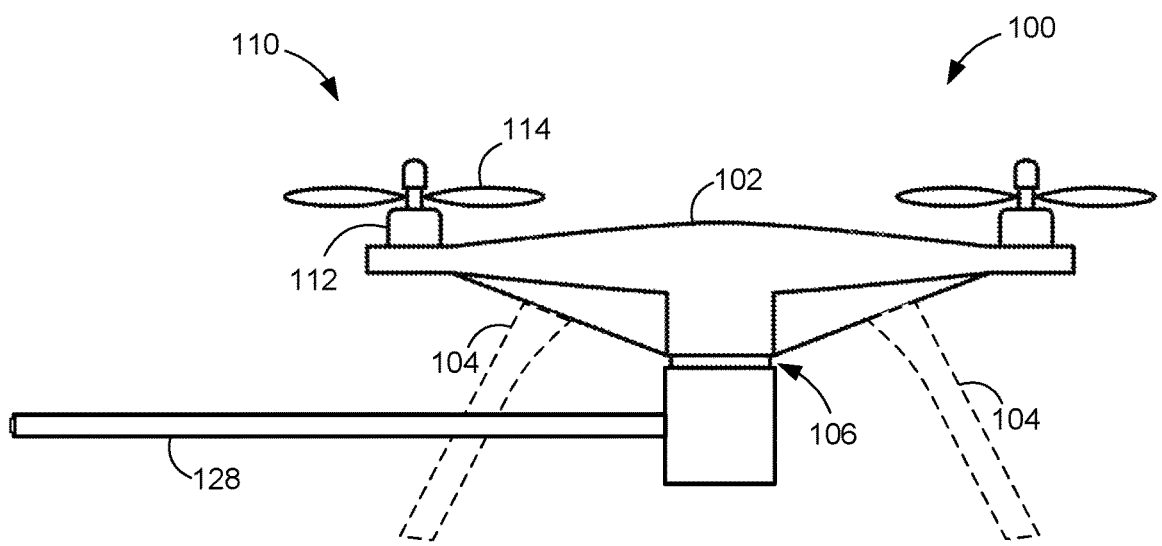

As illustrated in FIG. 1F, the borescope 128 can be configured to detachably attach to the UAV 100 (directly to the UAV 100, via a sensor assembly 120 or another tool). The borescope 128 can be configured to obtain image data corresponding to images of a target area and/or object and output the image data for the controller. The image data can relate to still images, or the image data can relate to video images. The borescope 128 can be configured to obtain images in the visible spectrum, the infrared spectrum, the ultraviolet spectrum, or any other light spectrum. The borescope 128 can be configured to insert into an inspection hole (e.g., an inspection hole created by the drill) and obtain images from within the inspection hole. In this way, the borescope 128 can help determine the condition of a utility pole at various locations and heights along the utility pole. To help obtain clear images within the inspection hole, the borescope 128 can include one or more light sources (e.g., LEDs). The shaft of the borescope 128 can be rigid, or the shaft can be flexible. Optionally, the shaft of the borescope 128 can be extendable such that the length of the borescope's 128 shape can be varied (e.g., based on instructions from the controller).

Figure 1G:
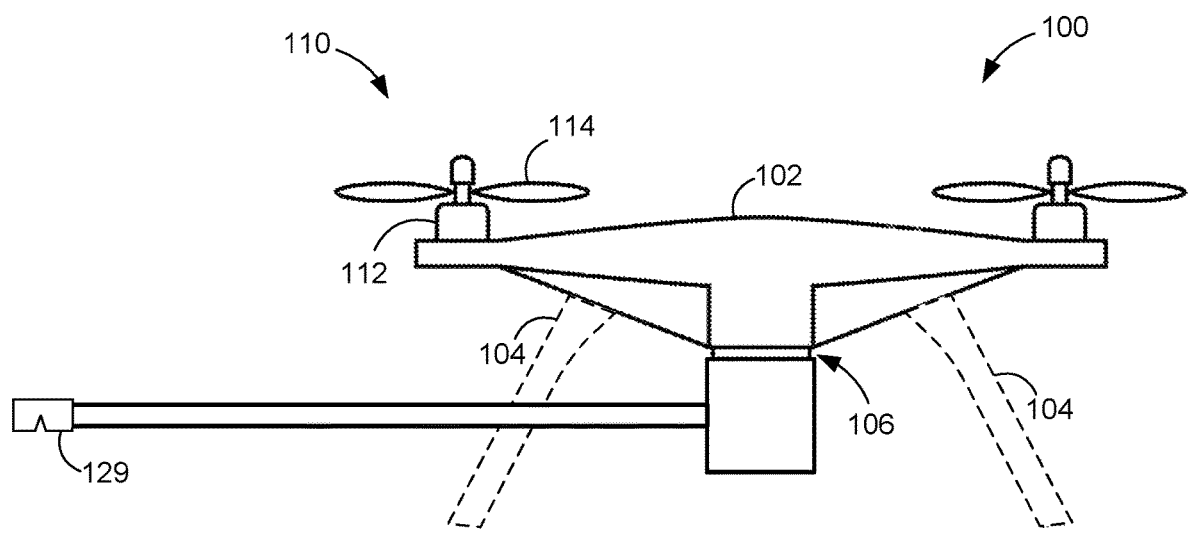

Referring to FIG. 1G, a non-conductive gap tool 129 can be configured to detachably attach to the UAV 100 (directly to the UAV 100, via a sensor assembly 120 or another tool). The non-conductive gap tool 129 can include an arm comprising a non-conductive material. The arm can be rigid (i.e., in a single position or configuration), or the arm can be articulable. At the end of the arm, the non-conductive gap tool 129 can include a piece of material having a notch. The piece of material can be a card-like shape (e.g., a substantially planar piece of material), for example. The notch can correspond to an expected dimension of a conductor (e.g., diameter or circumference), and if the conductor is the expected dimension, the notch can slide evenly along the conductor. If, however, the conductor is bulged (i.e., an increased dimension as compared to the expected dimension), it can be determined that the conductor is likely rusting and/or corroding.

To determine whether the conductor is bulged, the non-conductive gap tool 129 can include a hinge at the base (e.g., the end of the arm opposite the notched material) and a displacement sensor (e.g., a linear sensor, an angular sensor, a rotary sensor) configured to determine if the arm moves at the hinge, which can be indicative of an obstruction (e.g., bulge) along the conductor. Alternatively or in addition, the UAV 100 can be configured to move in a flight path approximately equal to the path of the conductor and any upward deviation from the path of the conductor (as determined by the flight path of the UAV 100) can be indicative of a bulge in the conductor. Stated otherwise, the flight path can be based on an observed path of the conductor and the flight path can be stored for increased precision and repeatability in subsequent tests or measurements. Alternatively or in addition, the UAV 100 can be configured to create a new flight path or alter or adjust a saved flight path during a subsequent test or measurement based on any observed changed in the path of the conductor.

Figure 2:
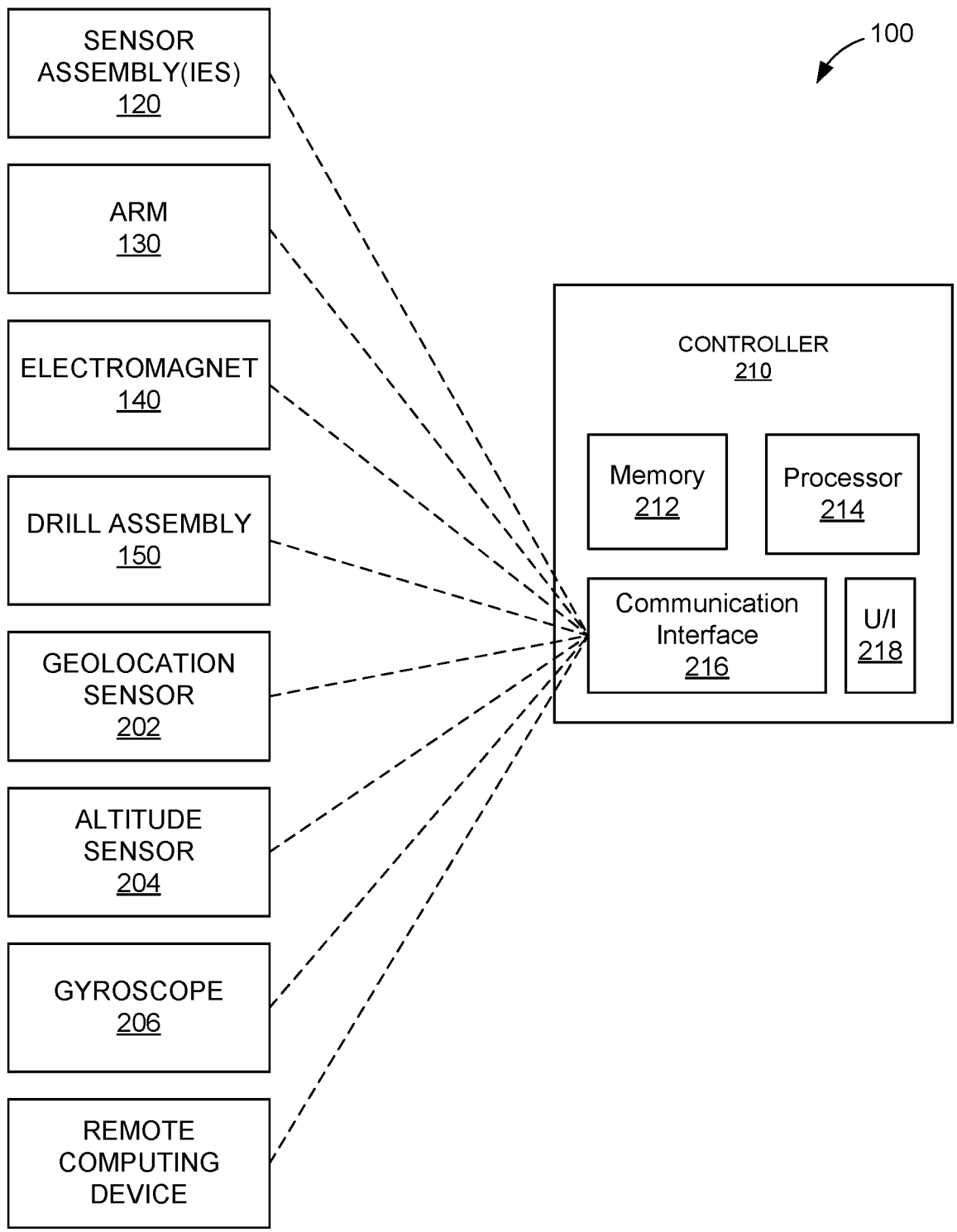
FIG. 2 illustrates a component diagram of an example UAV, in accordance with the disclosed technology.

Referring to FIG. 2, the UAV 100 can include a controller 210. The UAV 100 can further include a geolocation sensor 202 configured to provide a current geolocation of the UAV 100, an altitude sensor (e.g., a barometer) to provide a current altitude of the UAV 100, and/or one or more gyroscopes 206 or other sensor(s) configured to provide a current tilt or rotation of the UAV 100.

As described more fully herein, the controller 210 can receive data, such as from one or more sensor assemblies 120, the geolocation sensor 202, the altitude sensor 204, the gyroscope 206, and/or a remote computing device. Alternatively or in addition, the controller 210 can output instructions to one or more components (e.g., the arm 130, the electromagnet 140, and/or the drill assembly 150). For example, the controller 210 can perform one or more of the methods described herein or any part thereof. The controller 210 can be or include any control or computing system, such as a dedicated controller for the UAV 100. This disclosure references a single controller 210 for simplicity of discussion, but the disclosed technology is not so limited. For example, multiple computing device (e.g., a network of computing devices) can be used to perform one, some, or all of the actions and/or functionalities described herein. Moreover, a first computing device can perform one or more actions and/or functionalities, and a second computing device can perform one or more other actions and/or functionalities. As a specific example, it is contemplated that a local controller is configured to receive data from one or more sensor assemblies 120, the geolocation sensor 202, the altitude sensor 204, the gyroscope 206, and/or one or more components (e.g., the rotor assemblies 110, the arm 130, the electromagnet 140, and/or the drill assembly 150) and the controller can transmit some or all of that data to the remote computing device, which is configured to perform some or all of the analyses described herein. For example, certain analyses or determinations can be made by the remote computing device, and the remote computing device can transmit instructions to the UAV 100 (e.g., the local controller 210) for execution by the various components thereon.

The remote computing device can be in wireless communication with the controller, in indirect wired or wireless communication with the controller (e.g., via a network), locally located (i.e., with respect to the controller), and/or remotely located. As will be appreciated, any combination of steps described herein can be performed by a first computing device, and any combination of other steps described herein can be performed by a second computing device. That is to say, the disclosed technology contemplates transmission and receipt of data between different computing devices, although such steps may not be expressly discussed herein.

The controller 210 can include memory 212, a processor 214, a communication interface 216, and/or a user interface 218. The controller 210 can communicate with one or more sensors and/or devices, via the communication interface 216, as a non-limiting example. For example, the controller 210 can output instructions, and/or receive data, from one or more sensor assemblies 120, the geolocation sensor 202, the altitude sensor 204, the gyroscope 206, one or more components (e.g., the rotor assemblies 110, the arm 130, the electromagnet 140, and/or the drill assembly 150), and/or the remote computing device.

Based on received image data (e.g., from the camera 122 and/or borescope 128), the controller 210 can perform one or more image recognition processes. For example, the controller 210 can execute one or more object recognition algorithms and/or perform one or more image processing methods, such as Scale-Invariant Feature Transform (SIFT), Speeded Up Robust Features (SURF), Principal Component Analysis (PCA), Linear Discriminant Analysis (LDA), Region Based Convolutional Neural Networks (R-CNN), Fast R-CNN, Faster R-CNN, Mask R-CNN, Histogram of Oriented Gradients (HOG), Region-Based Fully Convolutional Network (R-FCN), Single Shot Detector (SSD), Spatial Pyramid Pooling (SPP-net), or You Only Look Once (YOLO), as non-limiting examples.

The controller 210 can identify and/or recognize several different components, sub-components, and the like for a given structure. For example, the computing device can identify and/or recognize utility poles, towers, crossarms, transformers, insulator, lightning arrestors, various electrical wires (e.g., primary wires, neutral wires, secondary wires, and/or ground wires), cutouts, various communication wires (e.g., telephone wires, internet wires, and/or cable wires), guy wires, lamps, and the like. Optionally, the controller 210 can identify and/or recognize different models of the components, sub-components, and the like. The controller 210 can output instructions for displaying (e.g., on a display device which can be associated with the remote computing devices) one or more images based on the camera data.

The user interface 218 of the computing device 210 (or a user interface of a different device, such as a technician device) can enable the technician or another user to interact with the various components of the UAV 100. Thus, the technician or user can manually guide the propulsion of the UAV 100 and/or the manipulation of one or more tools or components (e.g., the arm 130, the electromagnet 140, and/or the drill assembly 150). Alternatively or in addition, the controller 210 can be configured to automatically perform some or all of the methods and processes described herein.

As discussed herein, the disclosed technology includes systems and methods for inspecting a structure with a UAV and/or performing one or more actions, such as maintenance actions, with a UAV. The features and other aspects and principles of the disclosed technology may be implemented in various environments. Such environments and related applications may be specifically constructed for performing the various processes and operations of the disclosed technology or they may include a general-purpose computer or computing platform selectively activated or reconfigured by program code to provide the necessary functionality. Further, the processes disclosed herein may be implemented by a suitable combination of hardware, software, and/or firmware. For example, the disclosed technology may implement general purpose machines configured to execute software programs that perform processes consistent with the disclosed technology. Alternatively, the disclosed technology may implement a specialized apparatus or system configured to execute software programs that perform processes consistent with the disclosed technology. Furthermore, although some disclosed technology may be implemented by general purpose machines as computer processing instructions, all or a portion of the functionality of the disclosed technology may be implemented instead in dedicated electronics hardware.

The disclosed technology also relates to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed technology may execute high level and/or low-level software instructions, such as machine code (e.g., such as that produced by a compiler) and/or high-level code that can be executed by a processor using an interpreter.

Figure 3:
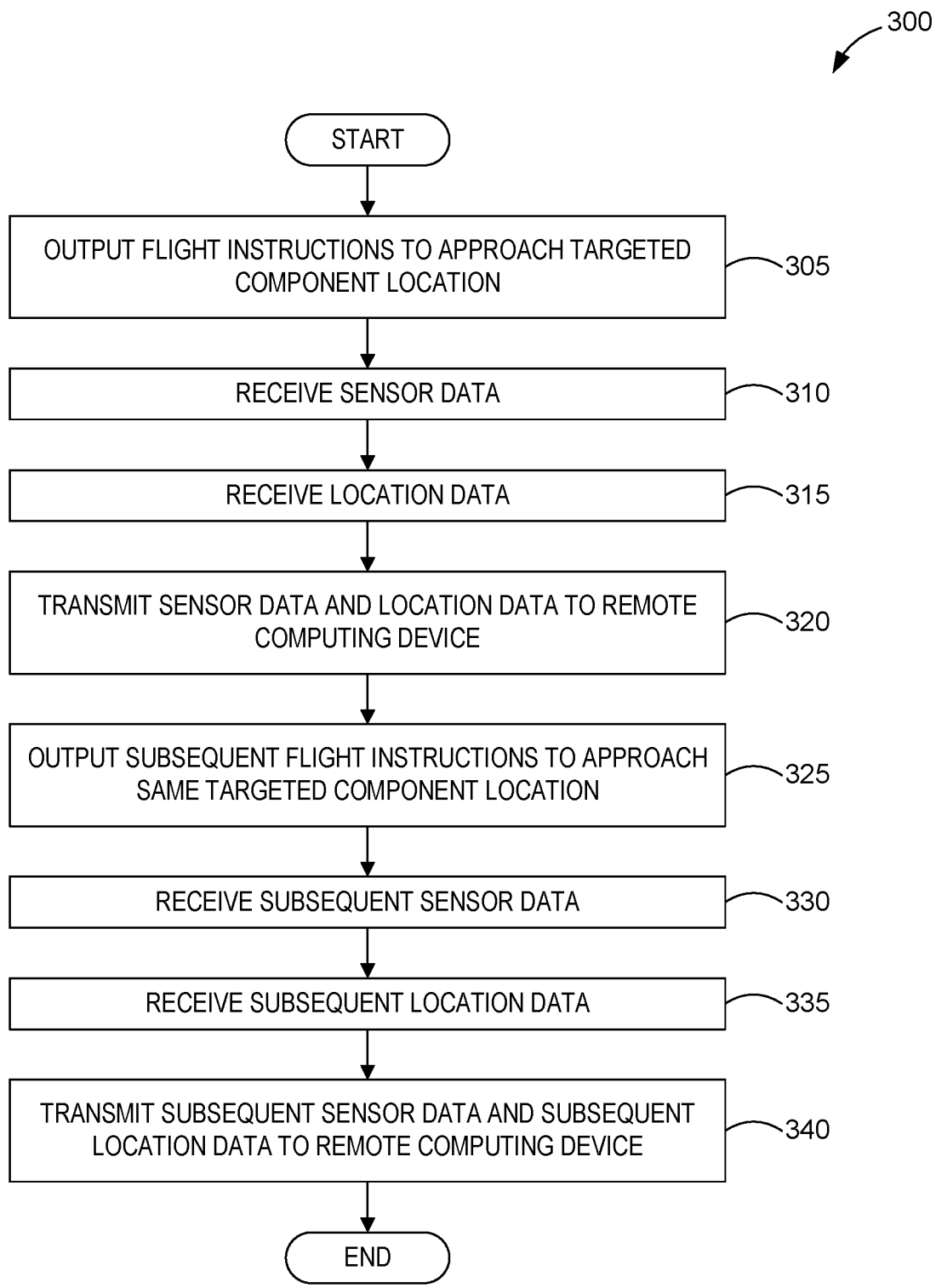
FIGS. 3-7 illustrate flowcharts of example methods for operating a UAV, in accordance with the disclosed technology.

FIG. 3 shows a flowchart of a method 300 for inspecting a structure with a UAV. The method 300 can be performed in whole or in part by the controller 210 or any other computing device. Moreover, the method 300 can be performed in conjunction with some or all of any other method described herein (e.g., method 400, method 500, method 600, method 700).

The method 300 can include outputting 305 flight instructions for a UAV (e.g., UAV 100) to approach a targeted location, such as the location of a particular component or portion of a structure. The flight instructions can be generated by a controller (e.g., controller 210) or can be received such as from a remote computing device and/or a user (e.g., a user manually controlling the flight path of the UAV via a remote computing device or controller device). Alternatively or in addition, the flight instructions can be predetermined or preprogrammed.

Once the UAV is at the targeted location, the method 300 can include receiving 310 sensor data and receiving 315 location data. The sensor data can be data from one or more sensor devices or assemblies, such as any of the sensor assemblies 120 described herein (e.g., the camera 122, the LiDAR sensor assembly 124, the ultrasonic probe assembly 126, current sensor assembly 127 the borescope 128, the caliper assembly), or any other type of sensor. The location data can include data received from one or more location sensors or devices (e.g., the geolocation sensor 202, the altitude sensor 204, the gyroscope 206), which can determine a location of the UAV corresponding to the received sensor data. The correlation between the sensor data and the location data can be highly granular such that fine measurements can be obtained and analyzed.

The method 300 can optionally include outputting instructions for an electromagnet (e.g., electromagnet 140) to engage, thereby temporarily locking the UAV in a particular location and/or position relative the structure. Alternatively or in addition, the method 300 can optionally include outputting instructions for the UAV to incrementally move along a section of the structure (or a component thereof) while the sensor devices and/or assemblies and the location devices and/or sensors are obtaining data. In this way, the UAV can be configured to obtain measurements along a sectional length of the structure (or component thereof). For example, the method 300 can include taking a measurement ever predetermined distance (e.g., every 50 thousandths of an inch) for a predetermined length (e.g., 10 feet, 15 feet).

As a non-limiting example, the sensor data can be or include caliper data from a caliper system (e.g., the caliper sensor assembly) and/or ultrasonic data from an ultrasonic sensor assembly (e.g., ultrasonic probe assembly 126). In the case of the ultrasonic sensor assembly, the sensor or probe can be pressed against the structure or component to measure a depth, which can be used to determined changes in thickness. For example, the corresponding ultrasonic sensor data can be used (e.g., by the controller 210) to create a thickness profile of a given component or portion of the structure, and the thickness profile can identify changes in thickness, which can correspond to defects or deterioration. Such practices can be useful for overlapping plates at joints on a structure, for example. Measurements (e.g., ultrasonic measurements) can be taken on opposite sides of the overlapping plates at the joint (e.g., the inside and the outside of an overlapping plates) to determine or estimate a thickness of the overlapping plates. This can be particularly useful, as it may be difficult for the UAV to enter or access the space within a tower or other structure, and analysis of the overlapping joint plates can provide a good indication of the overall health of the tower or other structure. Regardless of the technology used, the obtained measurements can relate to a thickness of the structure or a component thereof. The measurements can be of sufficient granularity to identify or detect the existence of certain types of rust, such as superficial rust or pack rust. As a further example, the obtained measures can be used to differentiate between rust or corrosion and "clean" metal, differentiate between a protective coating layer or bare metal, and/or determine whether and to what extent a protective coating layer is deteriorating.

As another non-limiting example, the sensor data can be or include image data received from a camera (e.g., camera 122) and/or a specialty camera, such as a borescope (e.g., borescope 128). The images can be analyzed (e.g., by the controller 210) to detect damage, defects, or the like. Similarly, the sensor data can be or include LiDAR data received from a LiDAR sensor assembly (e.g., LiDAR sensor assembly 124) and/or radar data received from a radar sensor assembly. The corresponding LiDAR data and/or radar data can be analyzed (e.g., by the controller 210) to detect damage, defects, or the like.

As yet another non-limiting example, the sensor data can be or include current data received from a current sensor (e.g., current sensor 127). Using a UAV to obtain current data along a utility network, for example, can be helpful, as some structure locations throughout a given utility grid network are difficult to access and can sometimes be accessed over ground only by foot. As discussed more fully herein, the UAV can be programmed to test the current at multiple locations (e.g., at or near multiple structures) in a utility grid network, which can expedite testing and/or inspection of multiple locations in the utility grid network.

The location data can be or include geolocation data received from a geolocation sensor (e.g., geolocation sensor 202) indicative of a current geolocation of the UAV, altitude data received from an altitude sensor (e.g., altitude sensor 204) indicative of a current altitude of the UAV, and/or gyroscope data received from a gyroscope (e.g., gyroscope 206) indicative of a current tilt or rotation of the UAV.

The method 300 can include transmitting 320 the sensor data and location data to the remote computing device. For example, the method 300 can include transmitting 320 images received from the camera and/or specialty camera, caliper data received from the caliper system, ultrasonic data received from the ultrasonic sensor assembly, LiDAR data received from a LiDAR sensor assembly, radar data received from a radar sensor assembly, current data received from the current sensor, geolocation data received from the geolocation sensor, altitude data received from the altitude sensor, or gyroscope data received from the gyroscope, as non-limiting examples. The various data can be outputted for display on a display device for analysis by a user or technician. Alternatively or in addition, the method 300 can include locally saving the location data and/or flight instructions. As explained herein, saved location data and/or flight instructions can be subsequently used to precisely repeat a given test with any given type of sensor assembly.

The method 300 can include repeating the previous steps at a later time and/or date. As such, the method 300 can include observing a structure's (or component's) change in thickness over time or observing other changes to the structure (or component) over time.

More specifically, the method 300 can include outputting 325 subsequent flight instructions to approach the same targeted component location. The subsequent flight instructions can be the same as the initial flight instructions (see step 305). Thus, the UAV can be configured to return to the same, or substantially the same location, multiple times to obtain accurate data corresponding to changes to the structure over time. As such, the UAV can be configured to automatically obtain measurements at one or more precise locations at different times. The flight instructions can be preprogrammed. Alternatively, if the initial flight instructions were user-inputted, the user-inputted flight instructions can be saved as saved flight instructions and later implemented as the subsequent flight instructions.

Optionally, the saved flight instructions can correspond only to the portions of the initial flight instructions that relate to measurements being taken. For example, if the UAV is flown by a user around a structure and then flown to a component location to obtain ultrasonic sensor data, the saved flight instructions can include only the flight instructions associated with obtaining the ultrasonic sensor data and can omit the initial flight instructions associated with flying the UAV around the structure. As such, memory can be saved by reducing the size of the flight instructions, and the subsequent flight instructions can be shortened, which can in turn save time and battery life for the UAV.

The method 300 can include receiving 330 subsequent sensor data and receiving 335 subsequent location data, which can substantially correspond to the above discussion (see steps 310 and 315). The method 300 can include 340 transmitting the subsequent sensor data and/or the subsequent location data, which can substantially correspond to the above discussion (see step 320).

The data (e.g., sensor data, location data, subsequent sensor data, subsequent location data) can be transmitted in real-time or near-real-time such that a user can view the data as it is observed or measured or substantially as it is observed or measured. The data can be transmitted by wireless cellular technology (e.g., 5G) or any other useful technology or method.

Figure 4:
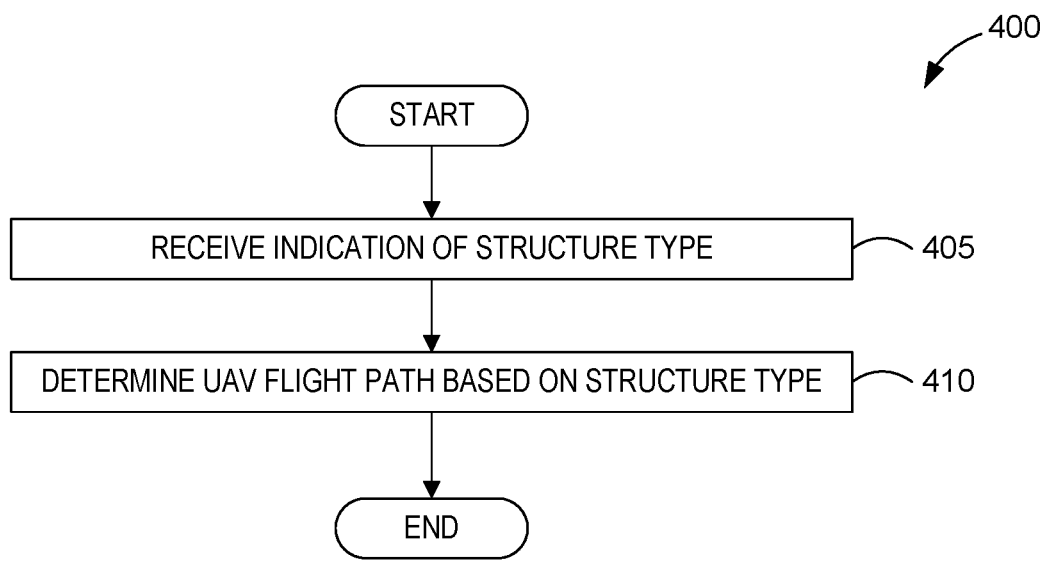

Referring to FIG. 4, the disclosed technology includes a method 400 for determining and/or saving a flight path for a given structure type. The method 400 can be performed in whole or in part by the controller 210 or any other computing device. Moreover, the method 400 can be performed in conjunction with some or all of any other method described herein (e.g., method 300, method 500, method 600, method 700).

The method 400 can include receiving 405 an indication of a structure type. The indication of the structure type can be user-inputted. Alternatively, the method 400 can include automatically determining a structure type based on sensor data received from one or more sensors (e.g., from any combination of the sensor assemblies described herein) of the UAV. For example, the UAV can be configured (e.g., based on programmed instructions for the controller 210) to fly to a structure and identify the structure based on sensor data.

The method 400 can include determining 410 a corresponding flight path based on the structure type. For example, a first flight path can correspond to utility poles of a certain height and/or having a certain arrangement of devices or components thereon, and a second, different flight path can correspond to utility poles of a different height and/or having a different arrangement of devices or components thereon. Further, a third, different flight path can correspond to metal towers of a certain height and/or design, and a fourth, different flight path can correspond to metal towers of a different height and/or a different design. Determining 410 the corresponding flight path can include identifying the flight path that is associated with the identified structure type.

Figure 5:
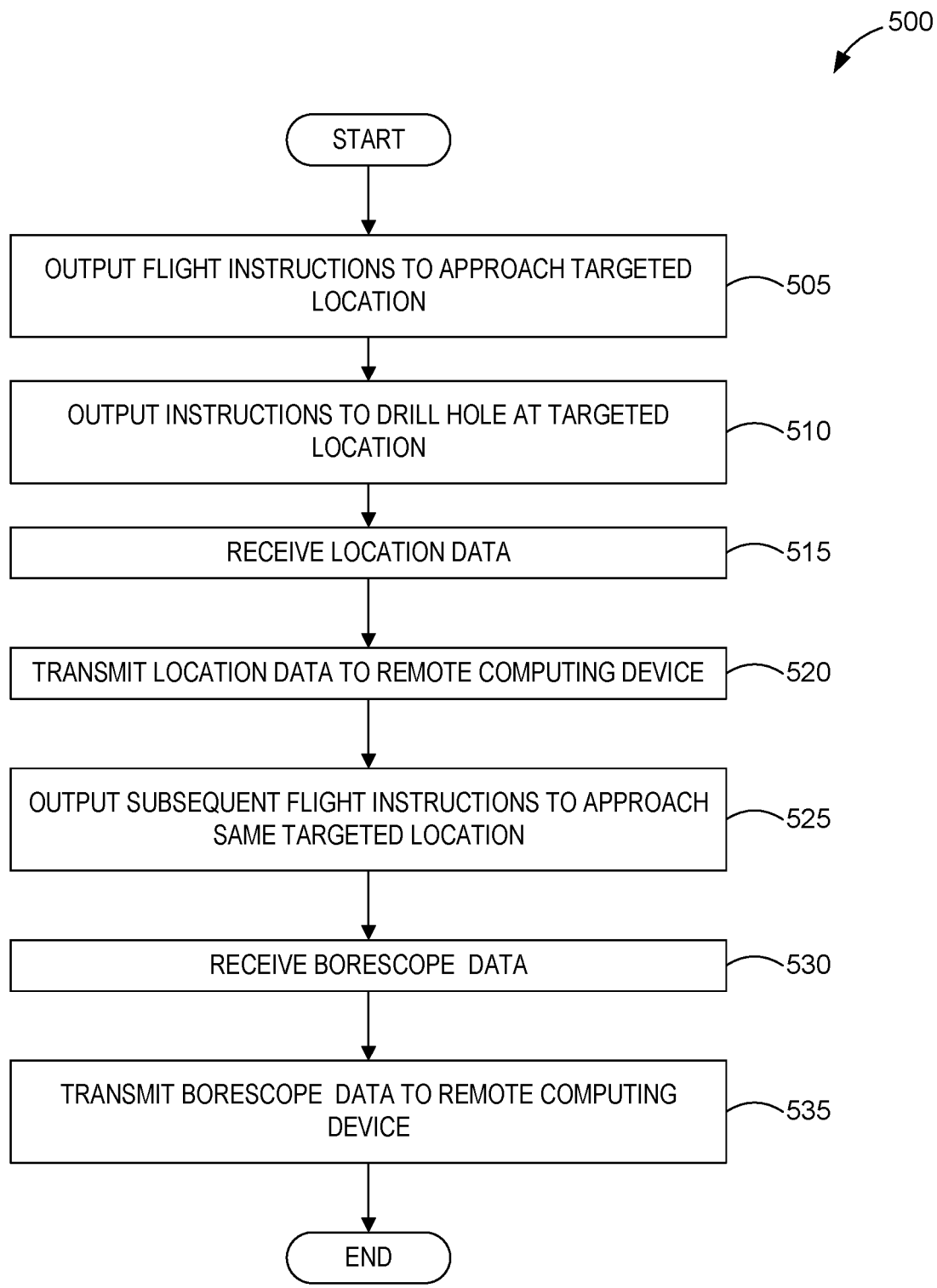

Referring to FIG. 5, the disclosed technology includes a method 500 for conducting an internal inspection of a utility pole or other structure. The method 500 can be performed in whole or in part by the controller 210 or any other computing device. Moreover, the method 500 can be performed in conjunction with some or all of any other method described herein (e.g., method 300, method 400, method 600, method 700).

The method 500 can include outputting 505 flight instructions for a UAV (e.g., UAV 100) to approach a targeted location, such as the location of a particular component or portion of a structure. The flight instructions can be generated by a controller (e.g., controller 210) or can be received such as from a remote computing device and/or a user (e.g., a user manually controlling the flight path of the UAV via a remote computing device or controller device). Alternatively or in addition, the flight instructions can be predetermined or preprogrammed.

The method 500 can include outputting 510 instructions for a drilling device (e.g., drill assembly 150) to drill or bore a hole into the structure at the targeted location. The instructions can include a depth and/or a drill angle. The method 500 can include receiving 515 location data corresponding to the target location. The location data can be or include geolocation data received from a geolocation sensor (e.g., geolocation sensor 202) indicative of a current geolocation of the UAV, altitude data received from an altitude sensor (e.g., altitude sensor 204) indicative of a current altitude of the UAV, and/or gyroscope data received from a gyroscope (e.g., gyroscope 206) indicative of a current tilt or rotation of the UAV. This can be particularly useful if, for example, the flight instructions were user-inputted. The method 500 can include transmitting the location data to a remote computing device. Alternatively or in addition, the method 500 can include locally saving the location data and/or flight instructions.

The method 500 can include outputting 525 subsequent flight instructions to approach the same targeted location. The subsequent flight instructions can be the same as the initial flight instructions (see step 305). Thus, the UAV can be configured to return to the same, or substantially the same location. Once at the same targeted location, the method 500 can include inserting a borescope (e.g., borescope 128) into the inspection hole. The insertion of the borescope can be automatically incorporated into the subsequent flight instructions (e.g., by the controller 210).

Optionally, the subsequent flight instructions can correspond only to the portions of the initial flight instructions that relate to the hole being drilled (e.g., only the location of the drilled hole). For example, if the UAV is flown by a user around a structure and then flown to a component location to obtain ultrasonic sensor data, the saved flight instructions can include only the flight instructions associated with drilling the hole and can omit the initial flight instructions associated with flying the UAV around the structure. As such, memory can be saved by reducing the size of the flight instructions, and the subsequent flight instructions can be shortened, which can in turn save time and battery life for the UAV.

The method 500 can include receiving 530 borescope data from the borescope and transmitting 535 the borescope data to the remote computing device. The borescope data can be transmitted in real-time or near-real-time such that a user can view the data as it is observed or measured or substantially as it is observed or measured. The data can be transmitted by wireless cellular technology (e.g., 5G) or any other useful technology or method.

Figure 6:
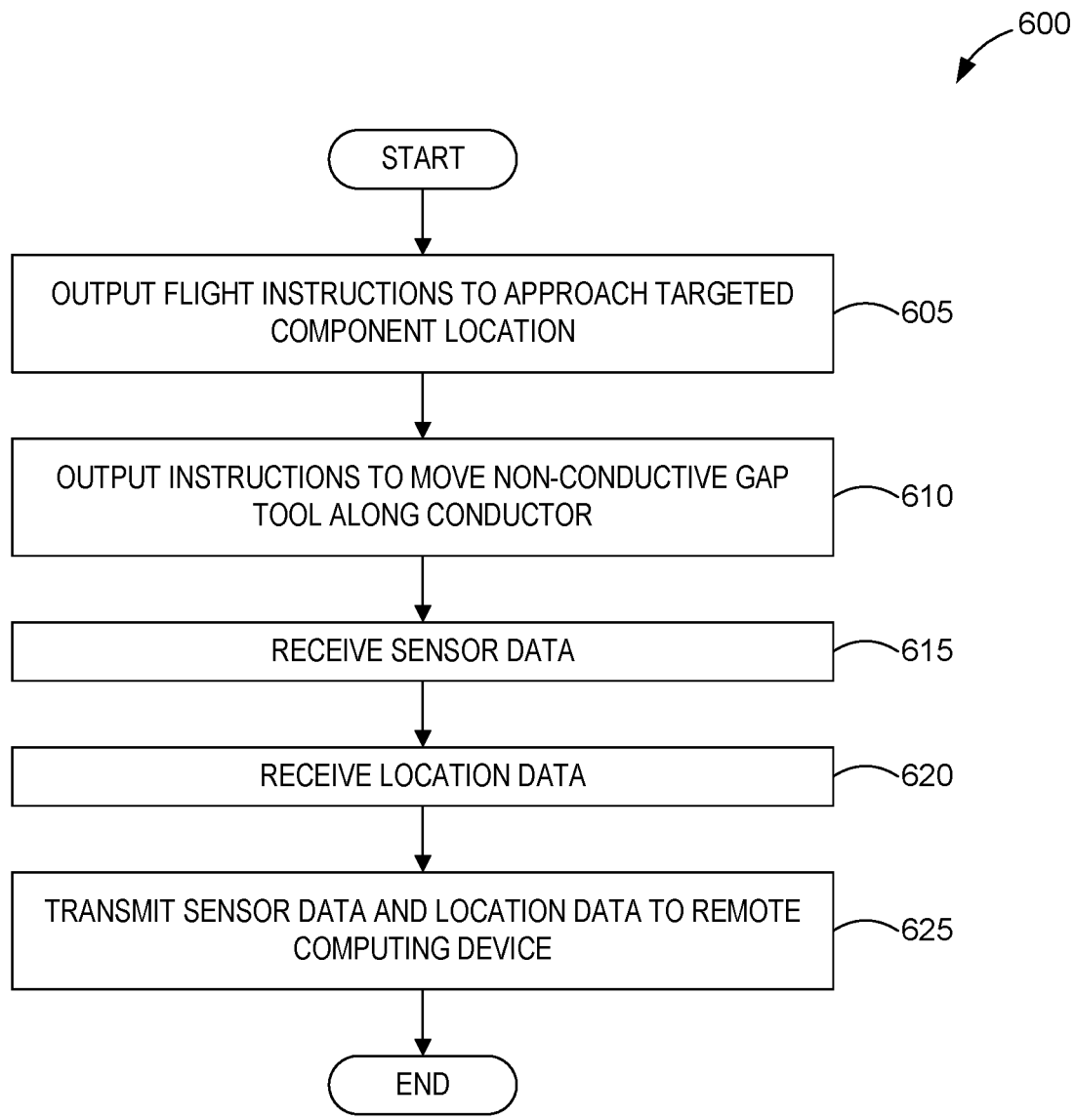

Referring to FIG. 6, the disclosed technology includes a method 600 for conducting an inspection of a conductor, such as a conductor in a utility grid network (e.g., on or near utility pole or other structure). The method 600 can be performed in whole or in part by the controller 210 or any other computing device. Moreover, the method 600 can be performed in conjunction with some or all of any other method described herein (e.g., method 300, method 400, method 500, method 700).

The method 600 can include outputting 605 flight instructions for a UAV (e.g., UAV 100) to approach a targeted location, such as the location of a conductor (e.g., a power transmission conductor). The flight instructions can be generated by a controller (e.g., controller 210) or can be received such as from a remote computing device and/or a user (e.g., a user manually controlling the flight path of the UAV via a remote computing device or controller device). Alternatively or in addition, the flight instructions can be predetermined or preprogrammed.

Once the UAV is at the targeted location, the method 600 can include outputting 610 instructions for the UAV to move a gap tool (e.g., gap tool 129) along the conductor; the method 600 can include receiving 615 sensor data and receiving 620 location data. The sensor data can be data from a non-conductive gap tool (e.g., non-conductive gap tool 129). As described herein, any bulge in the conductor can be indicative of corrosion on the conductor. If the bulge is detected by a motion sensor of the non-conductive gap tool, the correspond location data can be saved. The location data can include data received from one or more location sensors or devices (e.g., the geolocation sensor 202, the altitude sensor 204, the gyroscope 206), which can determine a location of the UAV corresponding to the sensor data indicative of a bulge in the conductor. The correlation between the sensor data and the location data can be highly granular such that fine measurements can be obtained and analyzed.

The method 600 can include transmitting 625 the sensor data and location data to the remote computing device. The data (e.g., sensor data, location data, subsequent sensor data, subsequent location data) can be transmitted in real-time or near-real-time such that a user can view the data as it is observed or measured or substantially as it is observed or measured. The data can be transmitted by wireless cellular technology (e.g., 5G) or any other useful technology or method.

If desired, the method 600 can include repeating the previous steps at a later time and/or data based at least in part on the flight data associated with obtaining the sensor data and the location data (such as is described with respect to steps 325-340 of method 300).

Figure 7:
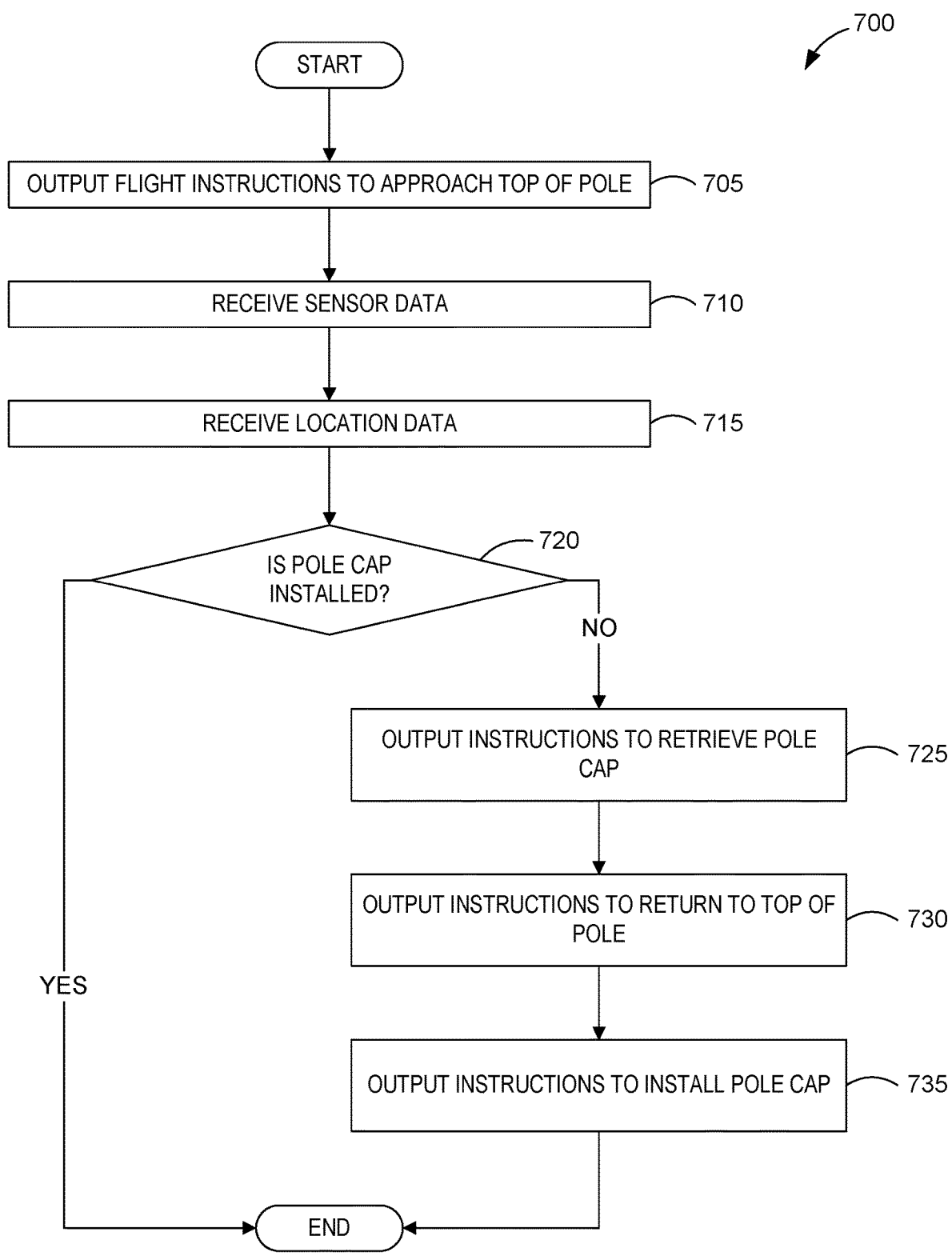

Referring to FIG. 7, the disclosed technology includes a method 700 for installing a pole cap on a utility pole (e.g., a pole cap as described in U.S. Pat. No. 10,227,747, the entire contents of which are incorporated herein by reference) The method 700 can be performed in whole or in part by the controller 210 or any other computing device. Moreover, the method 700 can be performed in conjunction with some or all of any other method described herein (e.g., method 300, method 400, method 500, method 600).

The method 700 can include outputting 705 flight instructions for a UAV (e.g., UAV 100) to approach a targeted location, such as the top of a utility pole. The method 700 can include receiving 710 sensor data and optionally receiving 715 location data. The sensor data can be data from one or more sensor devices or assemblies, such as any of the sensor assemblies 120 described herein (e.g., the camera 122), or any other type of sensor. The location data can include data received from one or more location sensors or devices (e.g., the geolocation sensor 202, the altitude sensor 204, the gyroscope 206), which can determine a location of the UAV corresponding to the received sensor data. The correlation between the sensor data and the location data can be highly granular such that fine measurements can be obtained and analyzed.

The method 700 can include, based at least in part on the sensor data (e.g., camera data), determining 720 whether the utility pole has a pole cap installed (e.g., based on one or more image recognition processes). Alternatively, the method 700 can include receiving an indication (e.g., from a database) of whether the utility pole has a pole cap installed. In any case, if the utility pole does have a pole cap installed, the method 700 can end with respect to that particular utility pole. Alternatively, the method 700 can include beginning the method 700 again for another utility pole. That is to say, if a first utility pole has a pole cap installed, the method 700 can include directing the UAV to fly to a second utility pole to determine whether a pole cap is installed on the second utility pole.

If the utility pole does not have a pole cap installed, the method 700 can include outputting 725 instructions for the UAV to retrieve a new pole cap, such as with one or more articulable arms (e.g., arm(s) 130). The method 700 can include outputting 730 flight instructions for the UAV to fly to the top of the utility pole with the new pole cap and outputting 735 instructions for the UAV to install the pole cap. As a non-limiting example, the instructions for installing the pole cap can include placing a central portion of the pole cap over a base surface of the end of the utility pole, folding a first strip of the pole cap over an edge of the base surface and circumferentially wrapping the first strip around a portion of a curved surface of the pole, folding a second strip of the pole cap over the edge of the base surface and circumferentially wrapping the second strip around a portion of a curved surface of the pole, folding a first flap over the edge of the base surface and over at least one of the first or second strips, and/or fold a second clap over the edge of the base surface and over at least one of the first or second strips. As will be appreciated, the back (i.e., the side facing the utility pole) of the pole cap can include an adhesive, which can attach the pole cap to the utility pole upon contact with the utility pole.

Optionally, the method 700 can include beginning the method 700 again for another utility pole. That is to say, upon installation of a pole cap on a first utility pole, the method 700 can include directing the UAV to fly to a second utility pole to determine whether a pole cap is installed on the second utility pole.

While certain examples of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products.

It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Although certain aspects of the disclosed technology are discussed herein in relation to a particular device or system or a particular method, it is contemplated that the disclosed technology is not so limited. To that end, any part of the devices or systems described herein can be embodied in, and/or performed as, a method and/or a non-transitory, computer-readable medium having instructions stored thereon that, when executed by a processor, cause a related device to perform the method; any part the methods described herein can be embodied in, and/or performed as, a device or system and/or a non-transitory, computer-readable medium having instructions stored thereon that, when executed by a processor, cause a related device to perform the method.

What is claimed is:

1. An unmanned aerial vehicle (UAV) for inspecting or maintaining a structure, the UAV comprising:
    a body;
    one or more rotor assemblies configured to provide lift and directional movement to the UAV;
    a connection port;
    a plurality of component assemblies, a first component assembly of the plurality of component assemblies being different from a second component assembly of the plurality of component assemblies, the first component assembly comprising a first side configured to detachably attach to the connection port and a second side configured to detachably attach to the second component assembly;
    a geolocation sensor configured to determine a current geolocation of the UAV and output geolocation data corresponding to the current geolocation of the UAV;
    an altitude sensor configured to detect a current altitude of the UAV and output altitude data corresponding to the current altitude of the UAV; and
    a controller configured to:
        receive component data from the component assembly;
        receive the geolocation data and the altitude data; and
        output flight instructions comprising geolocation data and altitude data corresponding to the component data, the flight instructions being associated with a flight path to one or more specific locations on the structure.

2. The UAV of claim 1, wherein the controller is further configured to:
    store the flight instructions on local memory of the UAV.

3. The UAV of claim 1, wherein the controller is further configured to:
    transmit the flight instructions to a remote computing device.

4. The UAV of claim 1, wherein the controller is further configured to:
    output the flight instructions to the one or more rotor assemblies to instruct the one or more rotor assemblies to navigate the UAV to the one or more specific locations on the structure.

5. The UAV of claim 1, wherein at least one component assembly of the plurality of component assemblies comprises a sensor assembly.

6. The UAV of claim 5, wherein the sensor assembly comprises a camera, a LiDAR sensor assembly, a radar sensor assembly, an ultrasonic probe assembly, a current sensor assembly, a borescope, a caliper assembly, or a non-conductive gap tool.

7. The UAV of claim 1, wherein at least one component assembly of the plurality of component assemblies comprises a tool assembly.

8. The UAV of claim 7, wherein the tool assembly comprises an articulable arm, an electromagnet, or a drill assembly.

9. The UAV of claim 1, wherein the controller is further configured to:
    associate the flight instructions with a structure type associated with the structure.

10. The UAV of claim 9, wherein:
    the structure is a first structure, and
    the controller is further configured to:
        in response to receiving data indicating that a second structure is of the structure type associated with the first structure, output the flight instructions to the one or more rotor assemblies to instruct the one or more rotor assemblies to navigate the UAV to one or more specific locations on the second structure that substantially correspond to the one or more specific locations on the first structure.

11. The UAV of claim 1, wherein:
    at least one component assembly of the plurality of component assemblies is a drill assembly,
    the component data corresponds to an inspection hole drilled into the structure by the drill assembly,
    the drill assembly is detachably attachable to the UAV,
    the UAV further comprises a borescope that is detachably attachable to the UAV, and the controller is configured to:
output the flight instructions to the one or more rotor assemblies to instruct the one or more rotor assemblies to navigate the UAV to the inspection hole and at least partially insert the borescope into the inspection hole.

12. The UAV of claim 1, wherein:
at least one component assembly of the plurality of component assemblies is a non-conductive gap tool having a notched portion, a notch of the notched portion being configured to at least partially receive and smoothly slide along a conductor having an expected dimension, and
the component data corresponds to a smoothness of a conductor associated with the structure, wherein a bump in the smoothness of the conductor is indicative of a detected dimension that is greater than the expected dimension, thereby indicating corrosion on the conductor.

13. The UAV of claim 12, wherein the non-conductive gap tool comprises a displacement sensor configured to detect whether the notched portion encounters the detected dimension of the conductor that is greater than the expected dimension.

14. The UAV of claim 12, wherein the controller is configured to:
determine that an actual flight path of the UAV is different from an expected flight path of the UAV, the expected flight path being based at least in part on a path of the conductor; and
determine that the detected dimension of the conductor is greater than the expected dimension based at least in part on the actual flight path of the UAV being different from the expected flight path of the UAV.

15. The UAV of claim 1 further comprising a gyroscope configured to output gyroscope data,
wherein the flight instructions further includes gyroscope data corresponding to the component data.

16. The UAV of claim 1 further comprising a lower frame,
wherein at least one component assembly of the plurality of component assemblies is attachable to an underside of the body,
wherein the lower frame is configured to support the UAV when the UAV is in a grounded position and has a height sufficient to provide clearance between a bottom edge of the component assembly of the plurality of component assemblies and a surface on which the lower frame rests when the UAV is in the grounded position.

17. An unmanned aerial vehicle (UAV) for inspecting or maintaining a structure, the UAV comprising:
a body;
one or more rotor assemblies configured to provide lift and directional movement to the UAV;
a camera;
an articulable arm configured to install a new pole cap on a top end of the structure;
a geolocation sensor configured to determine a current geolocation of the UAV and output geolocation data corresponding to the current geolocation of the UAV;
an altitude sensor configured to detect a current altitude of the UAV and output altitude data corresponding to the current altitude of the UAV; and
a controller configured to:
output instructions for the one or more rotor assemblies to navigate the UAV to the top end of the structure;
receive camera data from the camera;
determine, based at least in part on the camera data, whether an existing pole cap is located on the top end of the structure;
in response to determining that an existing pole cap is not located on the top end of the structure, output instructions for the articulable arm to install the new pole cap on the top end of the structure.

18. The UAV of claim 17, wherein the controller is further configured to:
prior to outputting the instructions for the articulable arm to install the new pole cap on the top end of the structure:
output instructions for the one or more rotor assemblies to navigate the UAV to the new pole cap;
output instructions for the articulable arm to retrieve the new pole cap; and
output instructions for the one or more rotor assemblies to navigate the UAV to the top end of the structure.

19. An unmanned aerial vehicle (UAV) for inspecting or maintaining a structure, the UAV comprising:
a body;
one or more rotor assemblies configured to provide lift and directional movement to the UAV;
a component assembly comprising a non-conductive gap tool having a notched portion, a notch of the notched portion being configured to at least partially receive and smoothly slide along a conductor having an expected dimension;
a geolocation sensor configured to determine a current geolocation of the UAV and output geolocation data corresponding to the current geolocation of the UAV;
an altitude sensor configured to detect a current altitude of the UAV and output altitude data corresponding to the current altitude of the UAV; and
a controller configured to:
receive component data from the component assembly, the component data corresponding to a smoothness of a conductor associated with the structure, wherein a bump in the smoothness of the conductor is indicative of a detected dimension that is greater than the expected dimension, thereby indicating corrosion on the conductor;
receive the geolocation data and the altitude data;
output flight instructions comprising geolocation data and altitude data corresponding to the component data, the flight instructions being associated with a flight path;
determine that an actual flight path of the UAV is different from an expected flight path of the UAV, the expected flight path being based at least in part on a path of the conductor; and
determine that the detected dimension of the conductor is greater than the expected dimension based at least in part on the actual flight path of the UAV being different from the expected flight path of the UAV.

20. The UAV of claim 19, wherein the non-conductive gap tool comprises a displacement sensor configured to detect whether the notched portion encounters the detected dimension of the conductor that is greater than the expected dimension.

* * * * *